United States Patent
Quintero

(10) Patent No.: US 10,769,229 B2
(45) Date of Patent: Sep. 8, 2020

(54) SEPARATION OF WORK AND PERSONAL CONTENT

(71) Applicant: Microsoft Technology Licensing, LLC, Redmond, WA (US)

(72) Inventor: Megan Marie Quintero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 904 days.

(21) Appl. No.: 15/098,315

(22) Filed: Apr. 14, 2016

(65) Prior Publication Data

US 2017/0300591 A1    Oct. 19, 2017

(51) Int. Cl.
*G06F 16/955* (2019.01)
*G06F 16/248* (2019.01)
*G06F 16/28* (2019.01)

(52) U.S. Cl.
CPC ........ *G06F 16/9562* (2019.01); *G06F 16/248* (2019.01); *G06F 16/285* (2019.01)

(58) Field of Classification Search
CPC ......... G06F 17/30884; G06F 17/30554; G06F 17/30598; G06F 17/30876; G06F 17/30873; G06F 17/30029; G06F 17/30902; G06F 17/30867; G06F 17/30896; G06F 17/30017; G06F 17/30905; G06F 16/9562; G06F 16/9535; G06F 16/957; G06F 16/951; G06F 16/954; G06F 16/9577; G06F 16/40; G06F 16/435; G06F 16/955; G06F 16/48; G06F 16/168; G06F 16/00; G06F 16/285; G06F 16/248; G06F 3/04842; G06F 3/0481; H04L 67/02

USPC ........................................................ 707/737
See application file for complete search history.

(56) References Cited

U.S. PATENT DOCUMENTS

| | | | |
|---|---|---|---|
| 7,844,576 B2 | 11/2010 | Kruis et al. | |
| 7,873,748 B2 | 1/2011 | Cabezas et al. | |
| 8,682,851 B2 | 3/2014 | Weber et al. | |
| 9,720,965 B1* | 8/2017 | Miskie | G06F 16/24535 |
| 2004/0043758 A1* | 3/2004 | Sorvari | H04M 1/72561 |
| | | | 455/414.1 |

(Continued)

OTHER PUBLICATIONS

Carvalho, L.G. et al., Synchronizing Web Browsing Data with Browserver, Jun. 1, 2010, IEEE Symposium on computers and Communications, pp. 738-743 (Year: 2010).*

(Continued)

*Primary Examiner* — James Trujillo
*Assistant Examiner* — Michal Bogacki
(74) *Attorney, Agent, or Firm* — Arent Fox LLP

(57) ABSTRACT

In one example, a user with multiple devices may have the same group of favorited webpages across each device while having the bookmark listing of the favorited pages organized to present a device-specific order. A user device may receive in a roaming bookmark listing profile a bookmark describing a webpage for ready access by a user. A user device may associate the bookmark with a usage data set describing an interaction with the webpage by the user. A user device may examine the usage data set for the webpage in relation to the user device. A user device may present the bookmark in a bookmark listing to a user based upon the usage data set.

20 Claims, 11 Drawing Sheets

(56) References Cited

U.S. PATENT DOCUMENTS

| | | | | |
|---|---|---|---|---|
| 2006/0161742 | A1* | 7/2006 | Sugimoto | H04N 7/17318 |
| | | | | 711/154 |
| 2007/0033275 | A1* | 2/2007 | Toivonen | G06F 16/9562 |
| | | | | 709/224 |
| 2007/0185827 | A1* | 8/2007 | Mrzyglocki | G06F 16/00 |
| 2008/0027914 | A1* | 1/2008 | Caputo | H04L 65/1069 |
| 2008/0040313 | A1* | 2/2008 | Schachter | G06F 16/9562 |
| 2008/0148193 | A1* | 6/2008 | Moetteli | G06F 16/954 |
| | | | | 715/854 |
| 2008/0172399 | A1* | 7/2008 | Chi | G06F 16/9562 |
| 2008/0301222 | A1 | 12/2008 | Schneider | |
| 2009/0043789 | A1* | 2/2009 | Gupta | G06F 16/435 |
| 2009/0164634 | A1* | 6/2009 | Brooks | H04L 61/1552 |
| | | | | 709/226 |
| 2010/0005106 | A1* | 1/2010 | Carter | G06F 16/9535 |
| | | | | 707/E17.112 |
| 2010/0153364 | A1* | 6/2010 | Kirby | G06F 16/9562 |
| | | | | 707/722 |
| 2010/0217844 | A1* | 8/2010 | Ninomiya | H04L 67/02 |
| | | | | 709/221 |
| 2010/0228693 | A1* | 9/2010 | Dawson | G06F 17/2705 |
| | | | | 706/12 |
| 2011/0145688 | A1* | 6/2011 | Han | H04M 1/72561 |
| | | | | 715/206 |
| 2013/0254685 | A1 | 9/2013 | Batraski et al. | |
| 2013/0318167 | A1* | 11/2013 | Sereboff | G06Q 10/109 |
| | | | | 709/204 |
| 2013/0339991 | A1* | 12/2013 | Ricci | H04N 21/44204 |
| | | | | 725/14 |
| 2015/0201040 | A1 | 7/2015 | Horling et al. | |
| 2016/0125209 | A1* | 5/2016 | Meyers | G06F 21/35 |
| | | | | 340/10.1 |
| 2017/0078414 | A1* | 3/2017 | Arulesan | H04L 67/22 |

OTHER PUBLICATIONS

Sharpened Productions, SIM Card (Subscriber Identification Module Card) Definition, TechTerms.com, Jul. 24, 2015, p. 1, <https://techterms.com/definition/sim_card> (Year: 2015).*

"Pinboard", Available at: <<https://pinboard.in/howto/>>, Retrieved on: Feb. 9, 2016, pp. 3.

"Firefox/Feature Brainstorming:Bookmarks", Available at: <<https://wiki.mozilla.org/Firefox/Feature_Brainstorming: Bookmarks>>, Retrieved on: Feb. 9, 2016, pp. 36.

Ningthoujam, Palin, "25+ Ways to Synchronize Your Bookmarks", Available at: <<http://mashable.com/2007/09/20/sync-bookmarks/#0DKPg3AboqqO>>, Sep. 20, 2007, pp. 14.

Tanmay, "Sync Firefox Bookmarks and Profile Data Using Dropbox", Available at: <<http://www.oxhow.com/sync-firefox-bookmarks-profile-data-using-dropbox/>>, Feb. 6, 2015, pp. 10.

Trapani, Gina, "Foxmarks Gets Selective Bookmark Syncing", Available at: <<http://lifehacker.com/398099/foxmarks-gets-selective-bookmark-syncing>>, Jul. 8, 2008, pp. 2.

"International Search Report and Written Opinion Issued in PCT Application No. PCT/US2017/026472", dated May 18, 2017, 10 Pages.

* cited by examiner

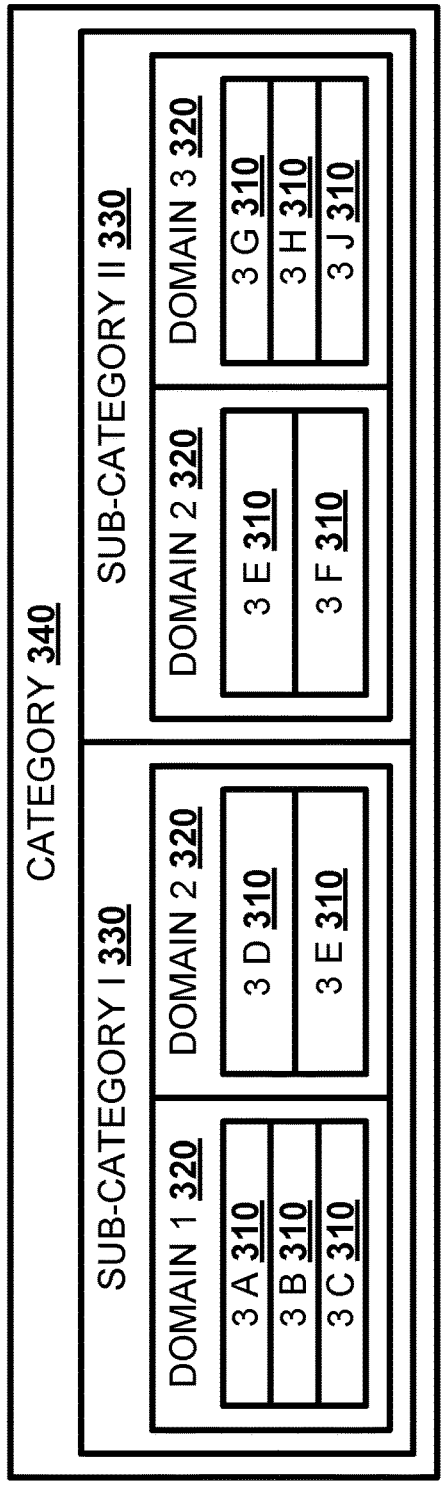
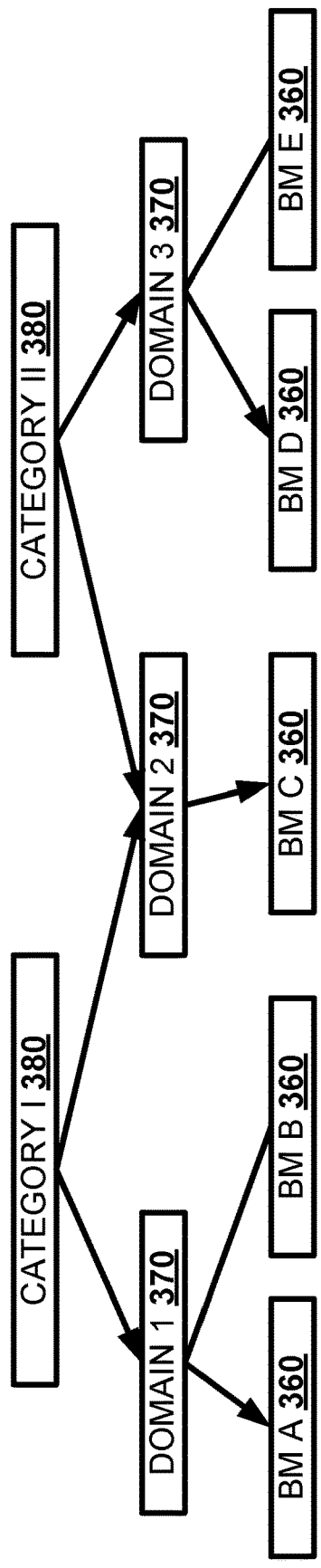

400

| USER ID 510 | DEVICE ID 520 | PAGE ID 530 | DOMAIN ID 540 | SOURCE ID 550 | ACCESSIBILITY 560 | HISTORY 570 |
|---|---|---|---|---|---|---|
| | | | | | DOMAIN 562 / LOCAL FILE 564 / PERMISSION 566 | HIT COUNT 572 / TIME 574 / FREQ 576 / SCHEDULE 578 |

SEPARATION OF WORK AND PERSONAL CONTENT

BACKGROUND

Previously, a user could use a browser to maintain a bookmark list storing a set of bookmarks representing preferred webpages for a user. The user may identify a webpage when browsing the webpage as a favorite webpage. The browser may then store a link or uniform resource locator to the webpage as a bookmark. The user may then manually group the bookmarks according to a user criteria. The bookmarks may be stored in a database file and folder tree structure.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to presenting the same group of favorited webpages across multiple devices while having the bookmark listing of the bookmarked pages organized to present a device-specific order. A user device may receive in a roaming bookmark listing profile a bookmark describing a webpage for ready access by a user. A user device may associate the bookmark with a usage data set describing an interaction with the webpage by the user. A user device may examine the usage data set for the webpage in relation to the user device. A user device may present the bookmark in a bookmark listing to a user based upon the usage data set.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 3a illustrates, in a block diagram, one example of a traditional file and folder bookmark list.

FIG. 3b illustrates, in a block diagram, one example of a characteristic association navigation bookmark listing.

FIG. 5 illustrates, in a block diagram, one example of a bookmark record.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a user device, a computing device, or a machine-implemented method.

In one example, a user with multiple devices may have the same group of favorited webpages across each device while having the bookmark listing of the favorited pages organized to present a device-specific order. A user device may receive in a roaming bookmark listing profile a bookmark describing a webpage for ready access by a user. A user device may associate the bookmark with a usage data set describing an interaction with the webpage by the user. A user device may examine the usage data set for the webpage in relation to the user device. A user device may present the bookmark in a bookmark listing to a user based upon the usage data set.

Currently for synchronizing browser content, a browser may present the same list of saved websites. The browser currently may not differentiate work content from personal content. Content access patterns may vary across devices for many reasons, such as device configuration, permissions based network access, current user flow, user location, task intent, and appropriateness of content for the environment.

A browser may use characteristic association to identify content that is not viewable to the user, based upon factors such as non-domain joined accounts, files not local to that particular machine, and network connectivity permissions. The feature user interface layer may display a bookmark listing differently to the user to indicate that the content is not available on that device. The user may decide to permanently not display a particular site on that device to avoid future clutter, without hindering the accessibility to that site on the other devices associated with the user. However, the browser may ensure that the user has access to all desired content.

Based upon metadata such as device accessed, time last accessed, and frequency of access on that device, a backend server may classify sites on a per device basis. The feature user interface layer may prioritize the order of the content based upon importance to that particular device. The browser may incorporate ordering and classification actions made by the user to ensure that the ordering and prioritization is as customized as possible on a per device level.

Figure 1:
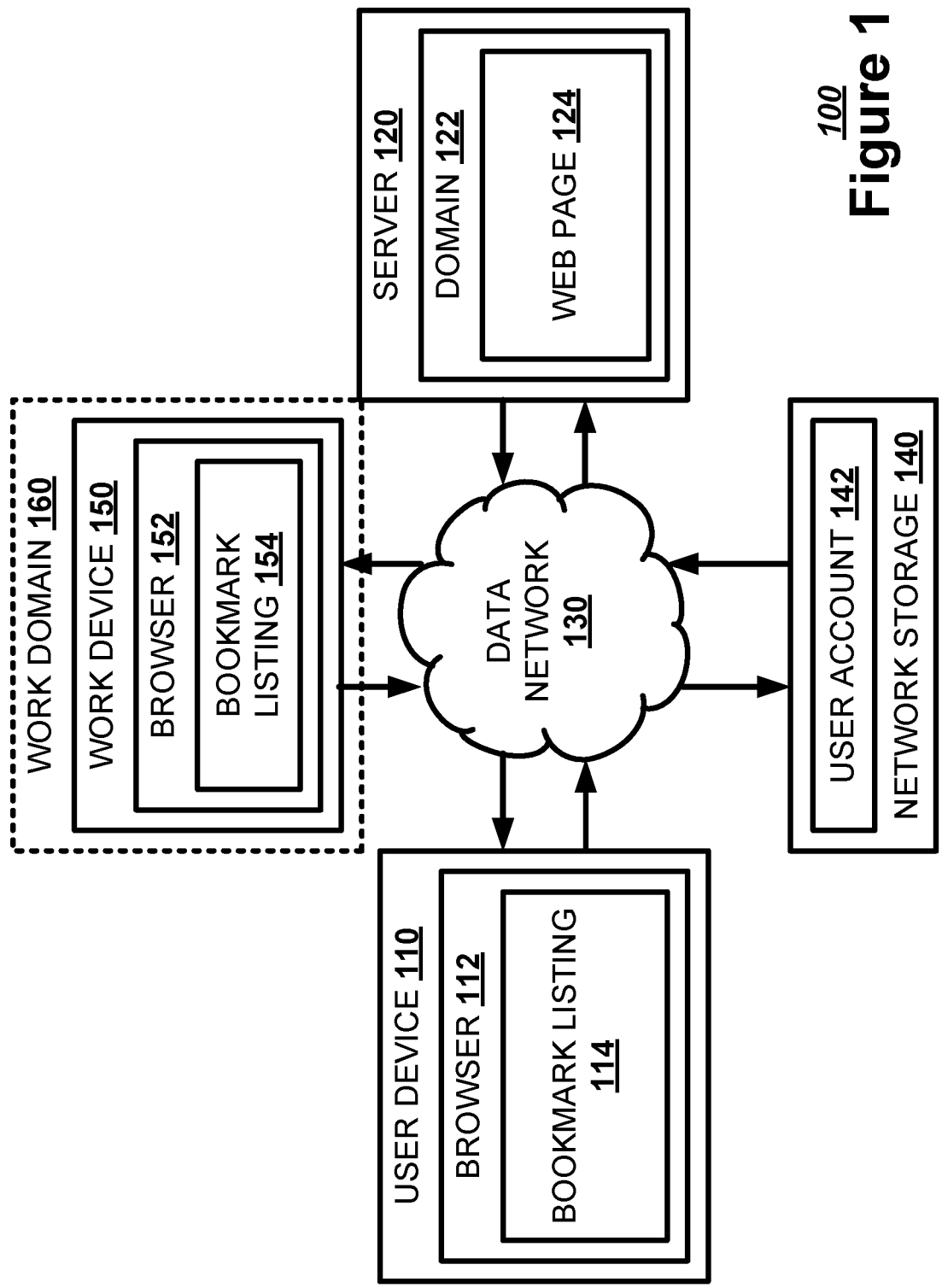
FIG. 1 illustrates, in a block diagram, one example of a data network.

FIG. 1 illustrates, in a block diagram, one example of a data network 100. A user device 110 may implement a browser 112, or similar communication application, to access a website server 120 via a data network connection 130. The website server 120 may present a domain 122 that provides one or more webpages 124. A domain 122 is an autonomous group of linked webpages 124, such as Macys.com or warnerbros.com. A webpage 124 is a discrete set of hypertext data that may be visually presented to a user. The website server 120 may be implemented on a single server or a distributed set of servers, such as a server farm. The data network connection 130 may be an internet connection, a wide area network connection, a local area network connection, or other type of data network connections.

The user device 110 may receive an indication from the user marking the webpage 124 as a favorite webpage. The browser 112 may represent the webpage with a bookmark in a bookmark listing 114, such as with a hyperlink or a uniform resource locator. The bookmark listing 114 may describe one or more webpages the user accesses on a regular basis. The browser 112 may store the bookmark listing 114 in a network storage 140 under a user account 142 associated with a user of the user device 110. A different user device associated with the same user account 142, such as a work device 150, may then implement a browser 152 to download an instance of the bookmark listing 154. Thus, the user may synchronize the bookmark listing 114 across multiple user devices.

By freeing the bookmark listing from the standard file and folder structure of a bookmark list, the home bookmark listing 114 on the user device 110 may have a different arrangement of webpages than the work bookmark listing 154 on the work device 150. In a characteristic association navigation approach, both the home bookmark listing 114 and the work bookmark listing 154 may draw from the same group of webpages, but each may arrange those webpages differently to emphasize different priorities. Further, each computing device may factor different device contexts to determine whether a webpage is even viable on that computing device. For example, availability of a webpage may depend on the work device 150 being a member of a work domain 160, representing local area network connection. A user device 110 not belonging to the work domain 160 may mark a webpage limited to the work domain 160 in the bookmark listing by graying out the link, or removing the link altogether.

Figure 2:
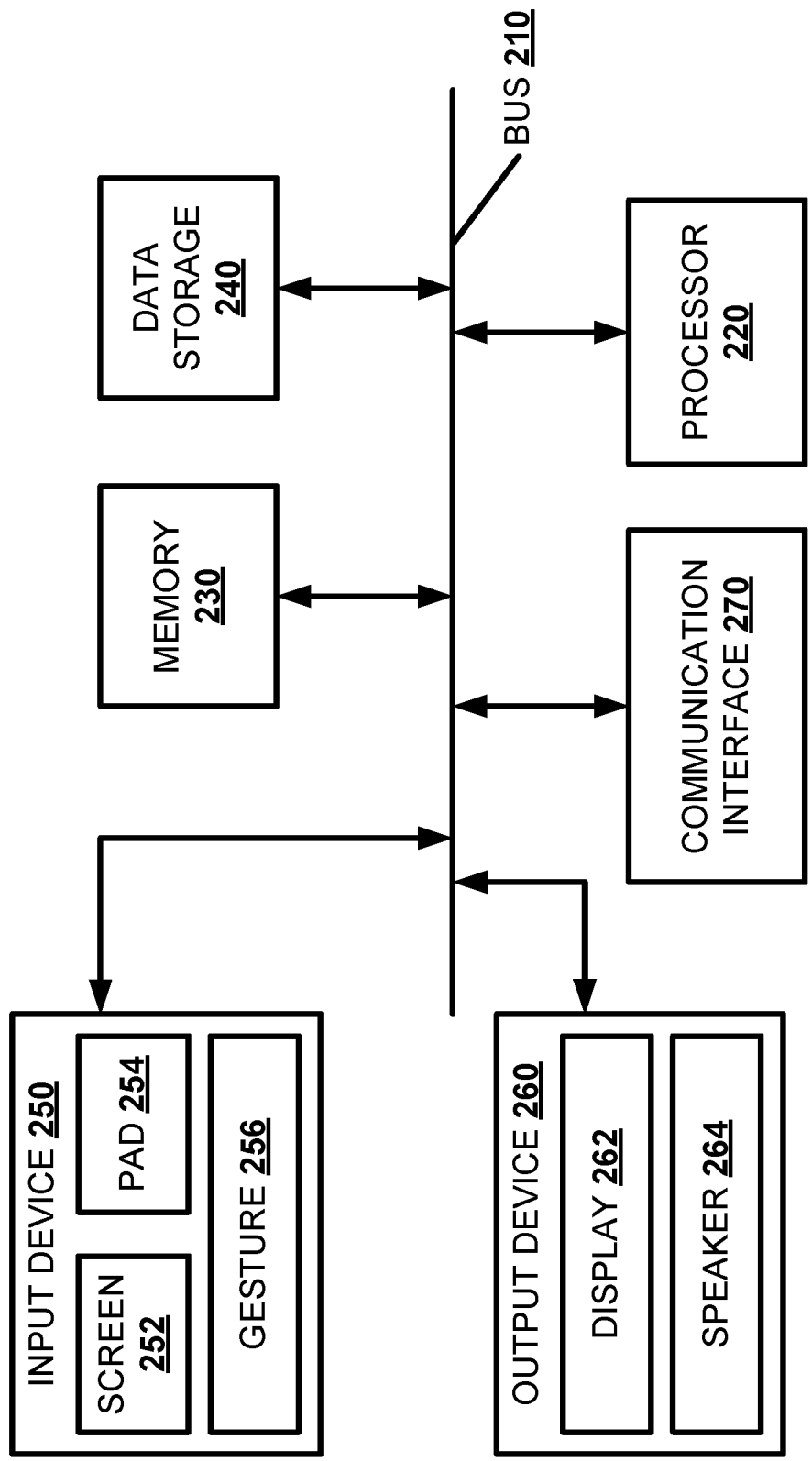
FIG. 2 illustrates, in a block diagram, one example of a computing device.

FIG. 2 illustrates a block diagram of an exemplary computing device 200 which may act as a home user device or a work device. The computing device 200 may combine one or more of hardware, software, firmware, and system-on-a-chip technology to implement a home user device or a work device. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may be configured to examine the usage data set for the webpage in relation to the computing device 200. The processing core 220 may be further configured to determine an availability for interaction with the webpage by the user on the computing device 200 based on a page accessibility tag. The processing core 220 may be also configured to mark the bookmark based on an accessibility comparison of a page accessibility tag with the device profile. The processing core 220 may be additionally configured to remove the bookmark from presentation to the user based on an accessibility comparison of a page accessibility tag with the device profile. The processing core 220 may be further configured to prioritize the bookmark in the bookmark listing based on a device-specific priority for the webpage for the user device. The processing core 220 may be also configured to arrange the bookmark listing on a per-presentation basis.

The memory 230 may be a random access memory (RAM) or another type of dynamic data storage that stores information and instructions for execution by the processor 220. The memory 230 may also store temporary variables or other intermediate information used during execution of instructions by the processor 220. The memory 230 may be configured to associate the bookmark with a usage data set describing an interaction with the webpage by the user. The usage data set may have a device access history describing a previous interaction with the webpage by the computing device and a page accessibility tag describing an accessibility characteristic of the webpage. The page accessibility tag may describe at least one of a domain membership for accessing the webpage, a local file parameter for use by the home user device with the webpage, and a network connectivity permission for the home user device to access the webpage. The memory 230 may be further configured to track a device-specific hit count for the webpage for the user device. The memory 230 may be also configured to store a device-specific hit count for the webpage for the user device in the usage data set. The memory 230 may be additionally configured to track a device source describing the user device receiving a user add input marking the webpage for inclusion in the bookmark listing.

The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing a bookmark listing.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The input device 250 may be configured to receive a local move input from the user changing a list position for the bookmark in the bookmark listing when presented on the user device. The input device 250 may be further configured to receive a local delete input from the user removing the bookmark from the bookmark listing when presented on the user device.

The output device 260 may include one or more conventional mechanisms that output information to the user, including a display screen 262, a printer, one or more speakers 264, a headset, a vibrator, or a medium, such as a memory, or a magnetic or optical disk and a corresponding disk drive. A display screen 262 may be configured to present the bookmark in a bookmark listing in the user device to a user based upon the usage data set.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may be configured to receive in a roaming bookmark listing profile a bookmark describing a webpage for ready access by a user. The communication interface 270 may be further configured to receive a device-specific priority for the webpage based on a device-specific hit count for the webpage for the user device.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

The user device may use a traditional file and folder structure or a characteristic association navigation structure. Previously, the traditional file and folder structure may lock a user bookmark into a specific disk storage structure in a specific category folder. Consequently, the traditional file and folder structure may lock the user bookmark into a specific presentation at a view layer of the user interface. FIG. 3a illustrates, in a block diagram, one example of a traditional file and folder bookmark list 300. The traditional file and folder tree bookmark list 300 may group a user bookmark 310 representing a webpage according to a domain for the webpage in a domain folder 320. The traditional file and folder tree bookmark list 300 then may group the domain folders 320 based upon a descriptive entity data set associated with the webpages in the domain folders 320. The traditional file and folder tree bookmark list 300 may store the grouped domain folders 320 in a sub-category folder 330. If the domain may be associated with multiple sub-categories, the user device may create different instances of the domain folder 320 containing those user bookmarks that match the sub-category. If the webpage may be associated with multiple categories, the user device may create multiple instances of the user bookmark for storage in those sub-category folders 330. The traditional file and folder tree bookmark list 300 may further group the sub-category folders 330 to be stored in a category folder 340.

By contrast, by using a characteristic association navigation bookmark listing, the user may navigate the webpage data more efficiently and accurately, improving user confidence in finding content. FIG. 3b illustrates, in a block diagram, one example of a characteristic association navigation bookmark listing 350. The characteristic association navigation bookmark listing 350 may store the bookmarks 360 representing favorite webpages in a structure similar to a database, with each bookmark 360 having a series of associated searchable characteristics. The characteristic association navigation bookmark listing 350 may associate each bookmark 360 belonging to a domain with a domain tag 370. The characteristic association navigation bookmark listing 350 further may associate a bookmark 360 with a category tag 380 based upon a descriptive entity data set associated with a webpage. The user device may navigate to the webpage in the bookmark listing using the characteristic association navigation bookmark listing 350. As opposed to with the file and folder bookmark list 300, the characteristic association navigation bookmark listing 350 may access a single instance of a bookmark 360 via multiple category tags 380.

Figure 4:
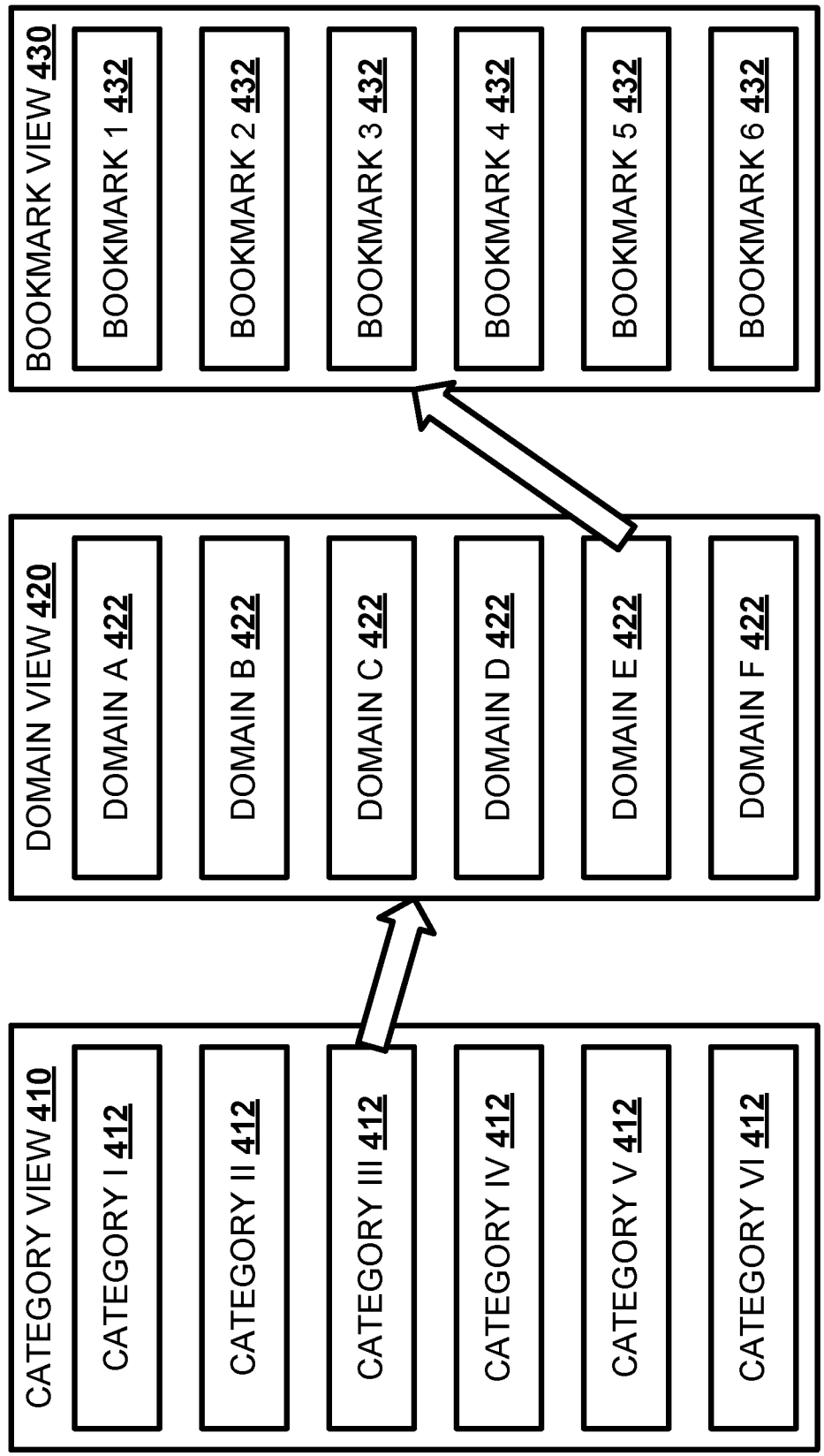
FIG. 4 illustrates, in a block diagram, one example of a user view of a bookmark listing.

FIG. 4 illustrates, in a block diagram, one example of a user view 400 of a bookmark listing. The browser may present a bookmark listing as a category view 410 displaying a set of categories 412 to the user. Once the user selects a category 412, the browser may present a domain view 420 displaying a set of domains 422 associated with that category 412. The domain view 420 may order the domains 422 based on the category 412 selected, with the domain 422 most closely matching the category 412 at the top. Once the browser selects a domain 412, the browser may present an item view 430 displaying a set of bookmarks 432 representing webpages at that domain 412. The item view 430 may order the bookmarks 432 based on the category 412 selected, with the bookmark 432 most closely matching the category 412 at the top. The browser may filter the bookmark 432 shown at the bookmark view to show just the bookmark 432 at that domain 422 associated with the selected category 412.

For example, the user may wish to access a webpage to buy a camping stove. The user may activate a browser on a user device. The browser may group the bookmarks representing webpages the user has identified as user favorites in to categories 412 based on descriptive entity data sets for those webpages for presentation in a category view 410. The category view 410 may present news, entertainment, sports, outdoor activities, shopping, and food. The user may select the category 412 shopping. The browser may present a list of domains 422 in the domain view 420. The domain view 420 may present REI.com, SportsBasement.com, Walmart.com, Target.com, Costco.com, and Macys.com. The user may select the domain 422 REI.com. The browser may present a list of bookmarks 432 at the item view 430. The item view 430 may present a camping gear webpage, an outdoor activity books page, a sports wear page, a cycling page, a snow sport page, and a water activities page. The browser may filter out a REI® web bookmark listing outdoor classes. The user then may access the camping gear webpage. The user device may update the descriptive entity data set for the camping gear webpage at that time. The user alternately may reach the bookmark 432 for the camping gear webpage via the sports category 412, the outdoor activities category 412, or the food category 412. The browser may adjust the descriptive entity data set for a webpage based on the user path to the bookmark 432.

The browser may adjust the descriptive entity data set for a webpage based on the usage of the webpage. The browser may maintain a bookmark record to track the webpage usage history of a user. The browser may use that webpage usage history to tailor the presentation of the bookmarks to a specific user device or environment. FIG. 5 illustrates, in a block diagram, one example of a bookmark record 500. The bookmark record 500 may have a user identifier (ID) 510 identifying the user interacting with the browser. The bookmark record 500 may have a device identifier 520 identifying the device implementing the browser. The bookmark record 500 may have a webpage identifier 530 for the webpage the user browsed. The bookmark record 500 may have a domain identifier 540 for the domain associated with the webpage. The bookmark record 500 may have a source identifier 550 indicating the user device receiving a user add input marking the web page for inclusion in the bookmark listing.

The bookmark record may have a device-specific usage data set describing the interactions between the device and the webpage represented by the bookmark. The bookmark record 500 may have one or more page accessibility tags 560 describing whether the device is able to access the webpage based on device configuration. For example, the page accessibility tag 560 may describe a domain membership 562 for accessing the webpage, a local file parameter 564 identifying a local file used by the user device with the webpage, or a network connectivity permission 566 describing the permission level on a network for a user device to access a webpage. The bookmark record 500 may have a device access history 570 describing a previous interaction with webpage by the user on the specific device. The usage data set 570 may have a device specific hit-count 572, a hit time 574, a hit frequency 576, and a hit schedule 578. The device-specific hit-count 572 may describe the number of accesses of the webpage by the user device. The hit time 574 may identify the time of the most recent hit by the device. The hit frequency 576 may describe the number of hits by a specific device over a set period of time. The hit schedule 578 may describe the time of day, the day of the week, or the day of the month when a device has accessed the webpage, allowing different bookmarks to be emphasized based on when the user is accessing the bookmark listing.

Figure 6:
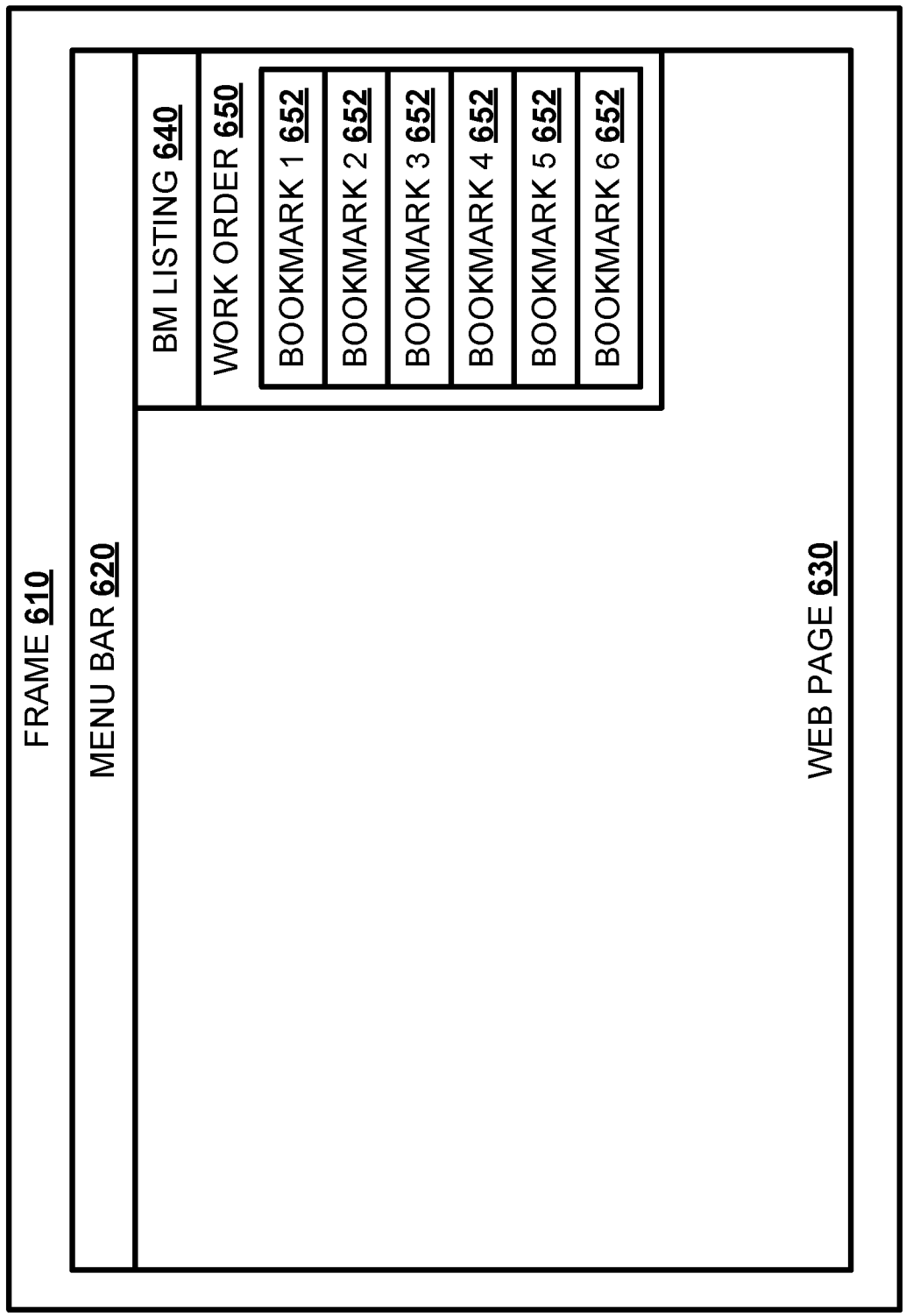
FIG. 6 illustrates, in a block diagram, one example of a business version of the browser interface.

The user may leverage the characteristic association navigation bookmark listing to emphasize different webpages on different devices associated with the user. FIG. 6 illustrates, in a block diagram, one example of a work version 600 of the browser interface. The browser interface 600 may have a frame 610 containing the user interface. The frame 610 may have a menu bar 620 providing controls for operating the browser module. The menu bar 620 may be hidden when not in use or may be present the entire time the browser module is active. The browser may present a webpage 630 to a user.

The browser may have a bookmark listing 640 enumerating in a work order 650 a list of one or more bookmarks 652. Generally, the bookmark listing 640 may arrange the bookmarks 652 so that the most relevant webpages for the user are listed before less relevant webpages. A network account may record a hit count for a user, identifying the number of times a user has visited a webpage on a per device basis. To properly separate content between a work device and a home user device, the work order 650 may arrange the bookmarks 652 so that the most relevant webpages for the work device are listed before less relevant webpages. A network account may record a hit count for a user on a device by device basis, identifying the number of times a user has visited a webpage on a specific user device. For example, the work order 650 may enumerate bookmark #1, bookmark #2, bookmark #3, bookmark #4, bookmark #5, and bookmark #6.

Figure 7:
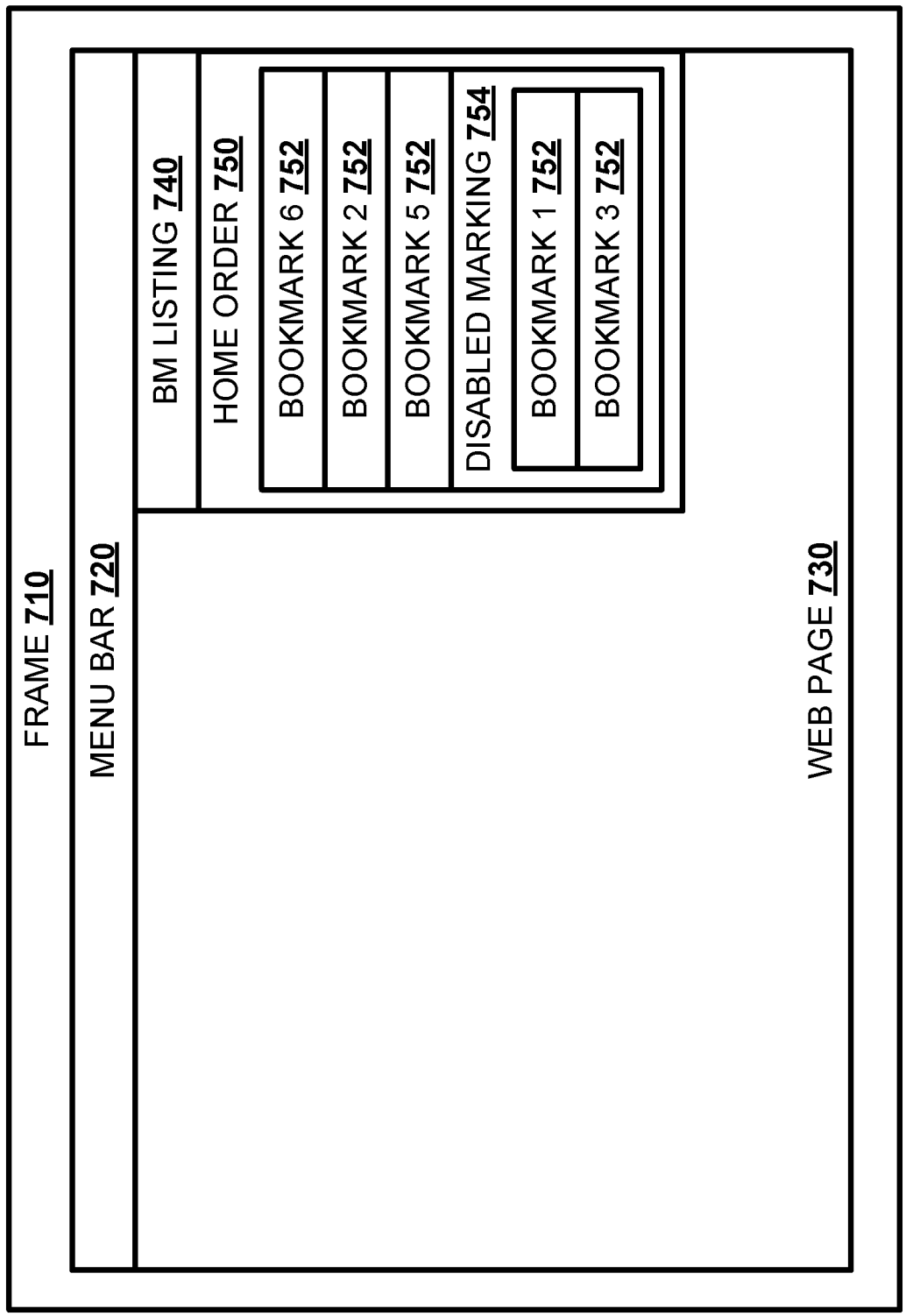
FIG. 7 illustrates, in a block diagram, one example of a home version of the browser interface.

FIG. 7 illustrates, in a block diagram, one example of a home version 700 of the browser interface. The browser interface 700 may have a frame 710 containing the user interface. The frame 710 may have a menu bar 720 providing controls for operating the browser module. The menu bar 720 may be hidden when not in use or may be present the entire time the browser module is active. The browser may present a webpage 730 to a user.

The browser may have a bookmark listing 740 enumerating in a home order 750 a list of one or more bookmarks 752. The home order 750 may arrange the bookmarks 752 so that the most relevant webpages for the home user device are listed before less relevant webpages. A network account may record a hit count for a user on a home user device basis, identifying the number of times a user has visited a webpage on the home user device. Further the browser may compare a page accessibility tag for a bookmark 752 to a device profile to determine whether the home user device is configured to access the webpage. If the webpage is not available, the home order 750 may apply a disabled marking 754 to the bookmark 752 as unavailable. The home order 750 may group the bookmarks 752 with a disable marking 754 towards the bottom, giving the bookmarks 752 the lowest priority. Alternately, if the accessibility issue is not correctable, the browser may remove the bookmark 752 from the bookmark listing altogether. For example, the home order 750 may enumerate bookmark #6, bookmark #2, and bookmark #5. The browser may apply a disabled marking 754 to bookmark #1 and bookmark #3. The browser may remove bookmark #1 altogether.

Figure 8:
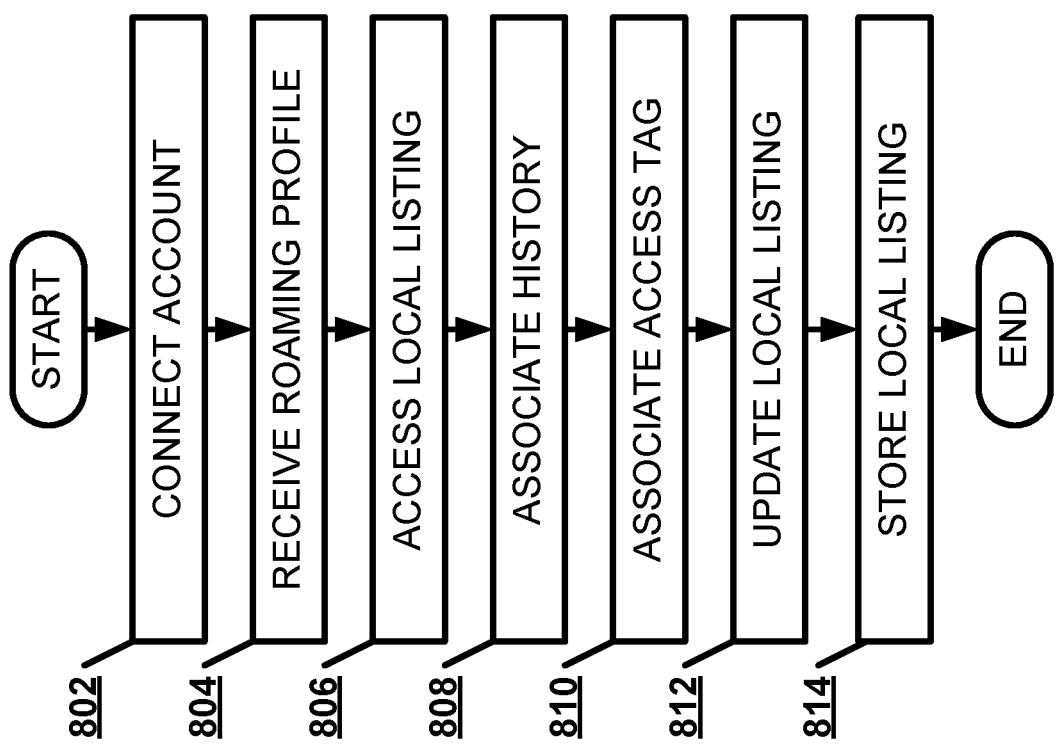
FIG. 8 illustrates, in a flowchart, one example of a method of generating a bookmark listing.

FIG. 8 illustrates, in a flowchart, one example of a method 800 of generating a bookmark listing. A user device, such as a home user device or a work device, may connect to a user account of a network storage (Block 802). The user device may receive in a roaming bookmark listing profile a bookmark listing having a bookmark describing a webpage for ready access by a user (Block 804). The user device may access a local bookmark listing stored in the user device (Block 806). The user device may associate the bookmark describing a webpage for ready access by a user with a device access history tracking a device-specific hit count for the webpage (Block 808). The user device may associate the bookmark describing a webpage for ready access by a user with a page accessibility tag describing an accessibility characteristic of the webpage with the bookmark (Block 810). The user device may update the local bookmark listing based on the roaming bookmark listing profile, adding any bookmarks added by other associated user devices (Block 812). The user device may store the bookmark listing having the bookmark associated with the usage data set and the page accessibility tag (Block 814).

Figure 9:
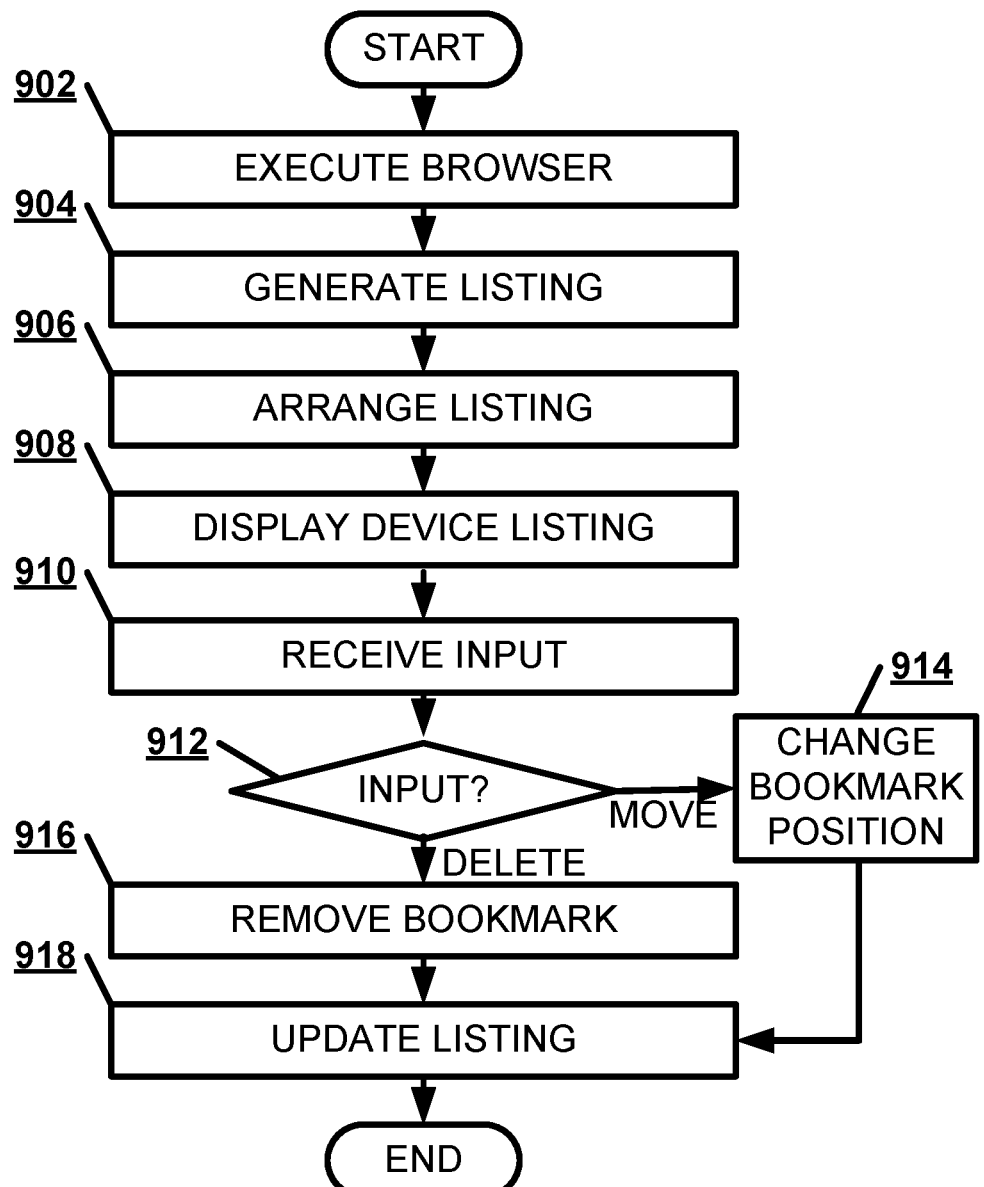
FIG. 9 illustrates, in a flowchart, one example of a method of presenting a bookmark listing.

FIG. 9 illustrates, in a flowchart, one example of a method 900 of presenting a bookmark listing. A user device, such as a home user device or a work device, may execute a browser to view internet content (Block 902). The browser may generate a bookmark listing for presentation to a user (Block 904). The browser may arrange the bookmark listing on a per-presentation basis, so that each time the bookmark listing is presented the browser arranges the individual bookmarks based on device usage (Block 906). The browser may display the bookmark in a bookmark listing in the computing device to a user based upon a device access history and an accessibility comparison (Block 908).

The browser may receive an input from a user (Block 910). If the browser receives a local move input from the user (Block 912), the browser may change a list position for the bookmark in the bookmark listing when presented on a user device, such as a home user device or a work device (Block 914). If the browser receives a local delete input from the user (Block 912), the browser may remove the bookmark from the bookmark listing when presented on a user device, such as a home user device or a work device, without removing the bookmark from the bookmark listing in other associated devices (Block 916). The browser may update the bookmark listing for the specific user device (Block 918).

Figure 10:
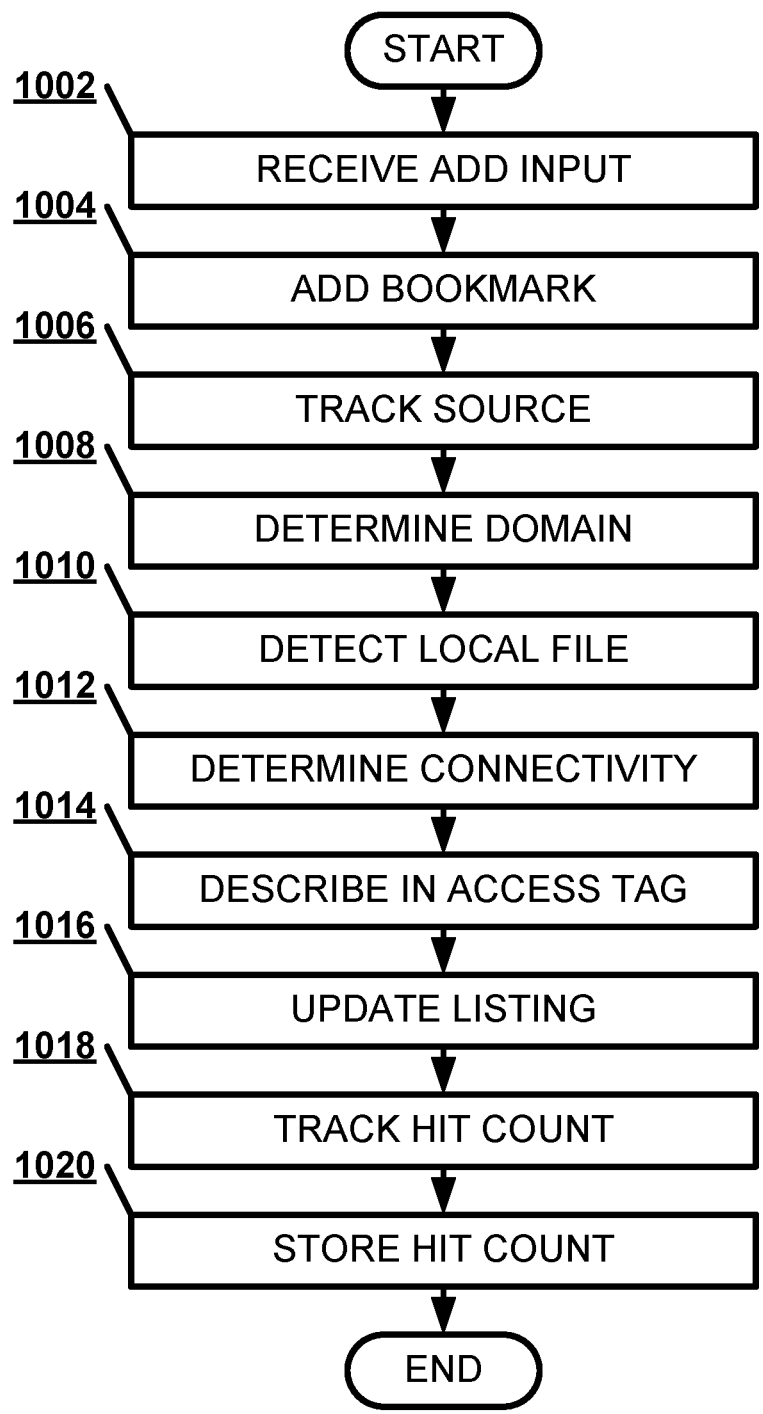
FIG. 10 illustrates, in a flowchart, one example of a method of adding a webpage to a bookmark listing.

FIG. 10 illustrates, in a flowchart, one example of a method 1000 of adding a webpage to a bookmark listing. A browser executed by a user device may receive an add input from a user while viewing a webpage (Block 1002). The browser may add a bookmark representing a webpage to a bookmark listing (Block 1004). The browser may track a device source for a user add input marking the webpage for inclusion in the bookmark listing (Block 1006). The browser may determine a domain membership for accessing the webpage (Block 1008). The browser may detect a local file parameter for use by the user device with the webpage (Block 1010). The browser may determine a network connectivity permission for the user device to access the webpage (Block 1012). The browser may describe with a page accessibility tag at least one of a domain membership for accessing the webpage, a local file parameter for use by the user device with the webpage, and a network connectivity permission for the user device to access the webpage (Block 1014). The browser may update the bookmark listing both locally and in the roaming profile to include the new bookmark (Block 1016). The browser may track a device-specific hit count for the webpage for the user device (Block 1018). The browser may store a device-specific hit count for the webpage for the user device in a device access history (Block 1020).

Figure 11:
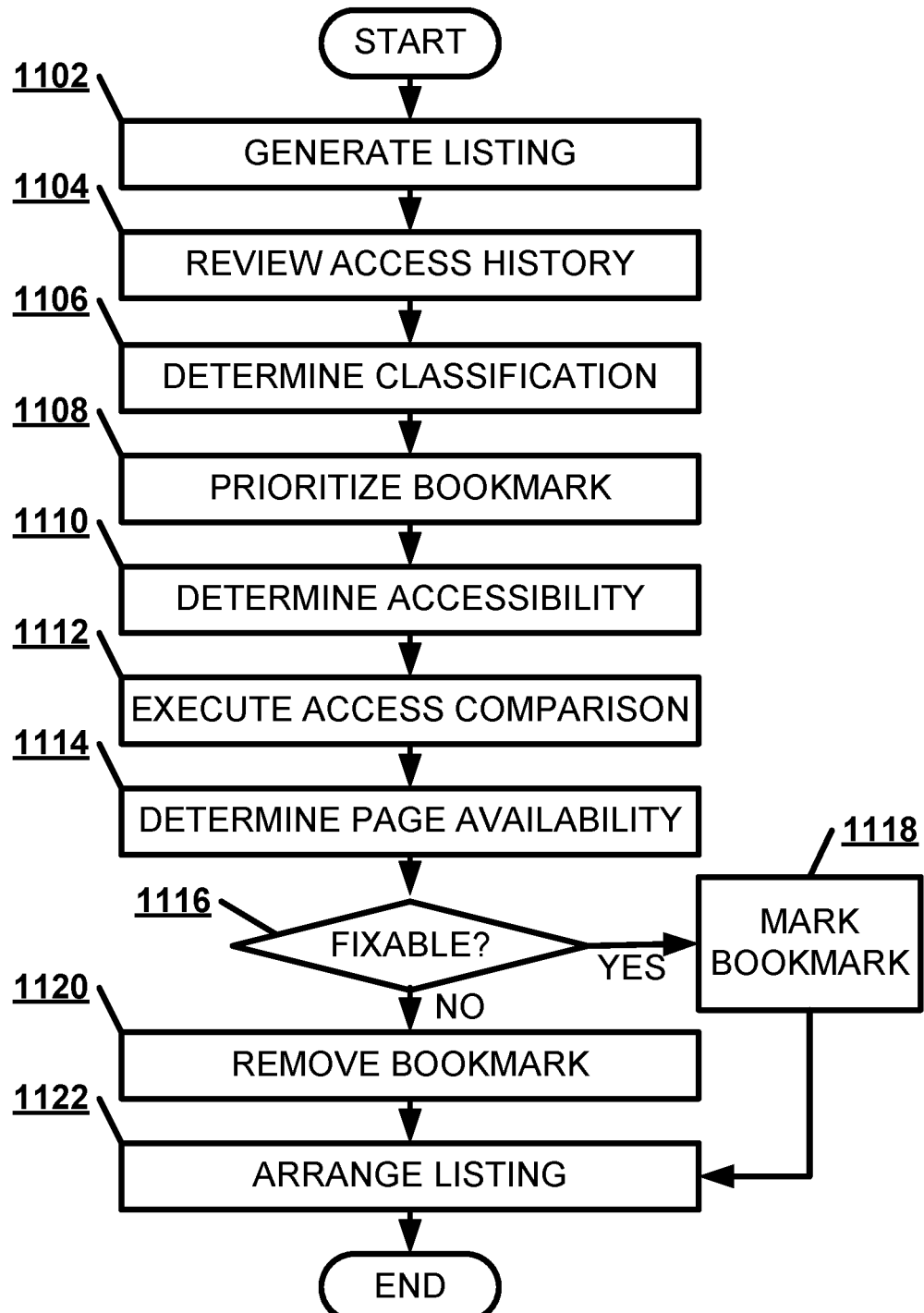
FIG. 11 illustrates, in a flowchart, one example of a method of arranging a bookmark listing.

FIG. 11 illustrates, in a flowchart, one example of a method 1100 of arranging a bookmark listing. The browser may generate a bookmark listing for presentation to a user (Block 1102). The browser may review a device access history describing a previous interaction with the webpage by the computing device prior to presentation of the bookmark listing to the user prior to a presentation (Block 1104). The browser may determine a device-specific classification of the webpage based on a device-specific hit count for the webpage for the user device (Block 1106). The browser may prioritize the bookmark in the bookmark listing based on a device access history for the webpage for the user device (Block 1108). The browser may determine a configuration of a webpage based on a page accessibility tag associated with the webpage (Block 1110). The browser may execute an accessibility comparison of the page accessibility tag with a device profile for the computing device to determine an availability for interaction with the webpage by the user on the computing device (Block 1112). The browser may determine an availability for interaction with the webpage by the user on the user device based on a page accessibility tag describing at least one of a domain membership for accessing the webpage, a local file parameter for use by the user device with the webpage, and a network connectivity permission for the user device to access the webpage (Block 1114). If the availability issue for the webpage may be fixed by changes to the user device configuration (Block 1116), the browser may mark the bookmark based on the accessibility comparison of a page accessibility tag with the device profile (Block 1118). Otherwise, the browser may remove the bookmark from presentation to the user based on an accessibility comparison of a page accessibility tag with the device profile (Block 1120). The browser may arrange the bookmark listing on a per-presentation basis (Block 1122).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A user device, comprising:
a communications interface configured to receive, in a roaming bookmark listing profile associated with one or more user devices, a bookmark describing a webpage for ready access by a user;
memory configured to associate the bookmark with a bookmark record including a device-specific usage data set describing an interaction with the webpage by the user, and a page accessibility tag describing whether the user device having a device identifier is able to access the webpage based on a configuration of the user device, the bookmark record further describing interactions between the user device and the webpage represented by the bookmark;
a processing core having at least one processor configured to examine the usage data set including the page accessibility tag for the webpage in relation to the user device and to mark the bookmark based on an accessibility comparison, by the user device, of a page accessibility tag with a device profile; and
a display screen configured to present the bookmark in a local bookmark listing associated with the user device to the user based upon the usage data set.

2. The user device of claim 1, wherein the usage data set has a page accessibility tag describing an accessibility characteristic of the webpage.

3. The user device of claim 1, wherein the processing core is further configured to determine an availability for interaction with the webpage by the user on the user device based on a page accessibility tag.

4. The user device of claim 3, wherein the page accessibility tag describes at least one of a domain membership for accessing the webpage, a local file parameter for use by the user device with the webpage, and a network connectivity permission for the user device to access the webpage.

5. The user device of claim 1, wherein the memory is further configured to track a device-specific hit count for the webpage for the user device.

6. The user device of claim 1, wherein the memory is further configured to store a device-specific hit count for the webpage for the user device in the usage data set.

7. The user device of claim 1, wherein the communication interface is further configured to receive a device-specific priority for the webpage based on a device-specific hit count for the webpage for the user device.

8. The user device of claim 1, wherein the processing core is further configured to prioritize the bookmark in the bookmark listing based on a device-specific priority for the webpage for the user device.

9. The user device of claim 1, wherein the processing core is further configured to arrange the bookmark listing on a per-presentation basis.

10. The user device of claim 1, wherein the memory is further configured to track a device source receiving a user add input marking the webpage for inclusion in the bookmark listing.

11. The user device of claim 1, further comprising:
an input device configured to receive a local move input from the user changing a list position for the bookmark in the bookmark listing when presented on the user device.

12. The user device of claim 1, further comprising:
an input device configured to receive a local delete input from the user removing the bookmark from the bookmark listing when presented on the user device.

13. A computing device, having a memory to store a series of instructions that are executed by at least one processor to implement a browser, the computing device configured to:
associate a bookmark describing a webpage for ready access by a user with a bookmark record including a page accessibility tag describing an accessibility characteristic of the webpage and whether the computing device having a device identifier is able to access the webpage based on a configuration of the computing device, the bookmark record further describing interactions between the computing device and the webpage represented by the bookmark;
execute an accessibility comparison, by the computing device, of the page accessibility tag with a device profile for the computing device to determine an availability for interaction with the webpage by the user on the computing device;
mark the bookmark based on the accessibility comparison of the page accessibility tag with the device profile; and
display the bookmark in a local bookmark listing in the computing device to the user based upon the accessibility comparison.

14. The computing device of claim 13, wherein the computing device is further configured to
describe with the page accessibility tag at least one of a domain membership for accessing the webpage, a local file parameter for use by the computing device with the webpage, and a network connectivity permission for the computing device to access the webpage.

15. The computing device of claim 13, wherein the computing device is further configured to
review a device access history describing a previous interaction with the webpage by the computing device prior to presentation of the bookmark listing to the user.

16. The computing device of claim 13, wherein the computing device is further configured to
prioritize the bookmark in the bookmark listing based on a device access history for the webpage for the computing device.

17. A machine-implemented method of a user device, comprising:
associating a bookmark describing a webpage for ready access by a user with a bookmark record including a device access history tracking a device-specific hit count for the webpage for the user device having a device identifier, the device access history describing a previous interaction with the webpage by the device based on the device identifier, the bookmark record further describing interactions between the user device and the webpage represented by the bookmark;
reviewing the device access history prior to a presentation;
prioritizing the bookmark in the local bookmark listing based at least on the device access history associated with the user device;
executing an accessibility comparison, by the user device, of a page accessibility tag with a device profile for the user device to determine an availability for interaction with the webpage by a user of the user device;
marking the bookmark based on the accessibility comparison of the page accessibility tag with the device profile;
arranging the local bookmark listing on a per-presentation basis including the prioritized bookmark; and
displaying the bookmark in the local bookmark listing in the user device to the user based upon the device access history.

18. The method of claim 17, further comprising:
determining an availability for interaction with the webpage by the user on the user device based on a page accessibility tag describing at least one of a domain membership for accessing the webpage, a local file parameter for use by the user device with the webpage, and a network connectivity permission for the user device to access the webpage.

19. The method of claim 17, further comprising:
tracking a device-specific hit count for the webpage for the user device.

20. The method of claim 17, further comprising:
storing a device-specific hit count for the webpage for the user device in a usage data set.

* * * * *